United States Patent [19]

Fick, Jr. et al.

[11] 4,128,916
[45] Dec. 12, 1978

[54] METHOD AND APPARATUS FOR PROCESSING PORK SIDES

[75] Inventors: Edwin O. Fick, Jr., Norfolk; Edward L. Bell, Madison, both of Nebr.

[73] Assignee: Madison Foods, Inc., Madison, Nebr.

[21] Appl. No.: 844,845

[22] Filed: Oct. 25, 1977

[51] Int. Cl.² ............................................. A22C 17/02
[52] U.S. Cl. ......................................... 17/52; 17/1 R; 17/24
[58] Field of Search ....................... 17/1 R, 24, 44, 52

[56] References Cited

U.S. PATENT DOCUMENTS

| | | | |
|---|---|---|---|
| 2,920,343 | 1/1960 | Bartels et al. | 17/52 |
| 3,177,521 | 4/1965 | Vogt et al. | 17/1 R |
| 3,546,737 | 12/1970 | Neebel et al. | 17/1 R |

Primary Examiner—Willie G. Abercrombie
Attorney, Agent, or Firm—Beveridge, DeGrandi, Kline & Lunsford

[57] ABSTRACT

A downwardly biased, upwardly movable wheel is positioned in the path of bodies of meat advancing on a conveyor having lateral hooks for impaling and retaining the meat. The rotational axis of the wheel lies at an acute angle to the conveyor direction, guiding the meat-engaging portion of the wheel in a path which lies convergent to the conveyor direction and has a lateral component opposed to the hooks. A pork side engaged by the rotating wheel is shifted laterally during conveyor movement to drive the pork side into impaled engagement on a hook for subsequent cutting of the loin from the belly.

21 Claims, 3 Drawing Figures

METHOD AND APPARATUS FOR PROCESSING PORK SIDES

BACKGROUND AND SUMMARY OF THE INVENTION

This invention relates to conveyorized meat processing facilities in which bodies of meat are affixed to a moving conveyor by means of lateral meat-impaling elements attached to the conveyor. More specifically, the invention pertains to a conveyor equipped with means for shifting the meat laterally of the conveyor in order to place the meat in impaled engagement on the impaling elements.

The primary use of this invention is in connection with the processing of pork sides. Customarily, pork sides are placed on a slat table conveyor, the upper surface of which is provided at spaced intervals with laterally-oriented impaling devices referred to as hooks. The sides are positioned in alignment with one of the hooks and then manually shifted laterally by a first operator to impale the side on the hook. A second operator, equipped with a two-handled loin pulling knife requiring manipulation by both hands, severs the loin from the side while the side is held in place by the side hooks.

The present invention accomplishes the function formerly performed by the first operator, i.e. it shifts the meat laterally of the conveyor into impaled engagement on the hooks so that the second operator may cut the loin from the side. This is a cost-reducing improvement as it eliminates the need for the first operator. Further, the apparatus of the invention is quite uncomplicated and inexpensive.

According to the present invention, a meat conveyor having lateral hooks is driven in a given direction, and a shifting means positioned above the conveyor in the path of the advancing bodies of meat shifts the meat laterally on the conveyor into impaled engagement on the lateral hooks. The meat-shifting means has a meat-engaging portion guided for movement in a path which is convergent to the conveyor direction and has a lateral component opposed to the hooks, causing meat engaged by the shifting means to be shifted laterally of the conveyor and driven into impaled engagement on said hooks.

Preferably, the meat-engaging portion is the lower portion of a rotary member, the rotational axis of which lies at an acute angle to the conveyor direction. The rotary member may have a toothed circular peripheral edge for engaging the meat, and be downwardly biased by a weighting chamber therein fillable with a fluent weighting material to apply a substantially constant downward force on the meat. The quantity of such weighting material is selected to apply sufficient force to the meat. The rotary member is supported on a pivoted support arm having an intermediate pivot, permitting it to move upwardly to maintain contact with the meat passing thereunder. The opposite end of the arm carries a flexible member which is anchored to limit the downward movement of the rotary member. It is also preferred that the hooks on the conveyor be spaced apart a distance no more than about six inches which is closer than the spacings previously employed in loin pulling slat table conveyors.

The invention also pertains to a method for pulling pork loins from pork sides on conveyors having lateral hooks, such a method being performed by placing a pork side in unimpaled engagement over the hooks, advancing the conveyor while engaging the upper surface of the side with a rotary member which has its rotational axis lying at an acute angle to the forward direction, rotating the rotary member while engaged with the side to shift the side laterally on the conveyor toward the impaling ends of the hooks into impaled engagement on the hooks, and cutting the pork loin from the impaled side.

For a complete understanding of the invention, reference is made to the appended drawings and the following description.

BRIEF DESCRIPTION OF A PREFERRED EMBODIMENT

Figure 1:
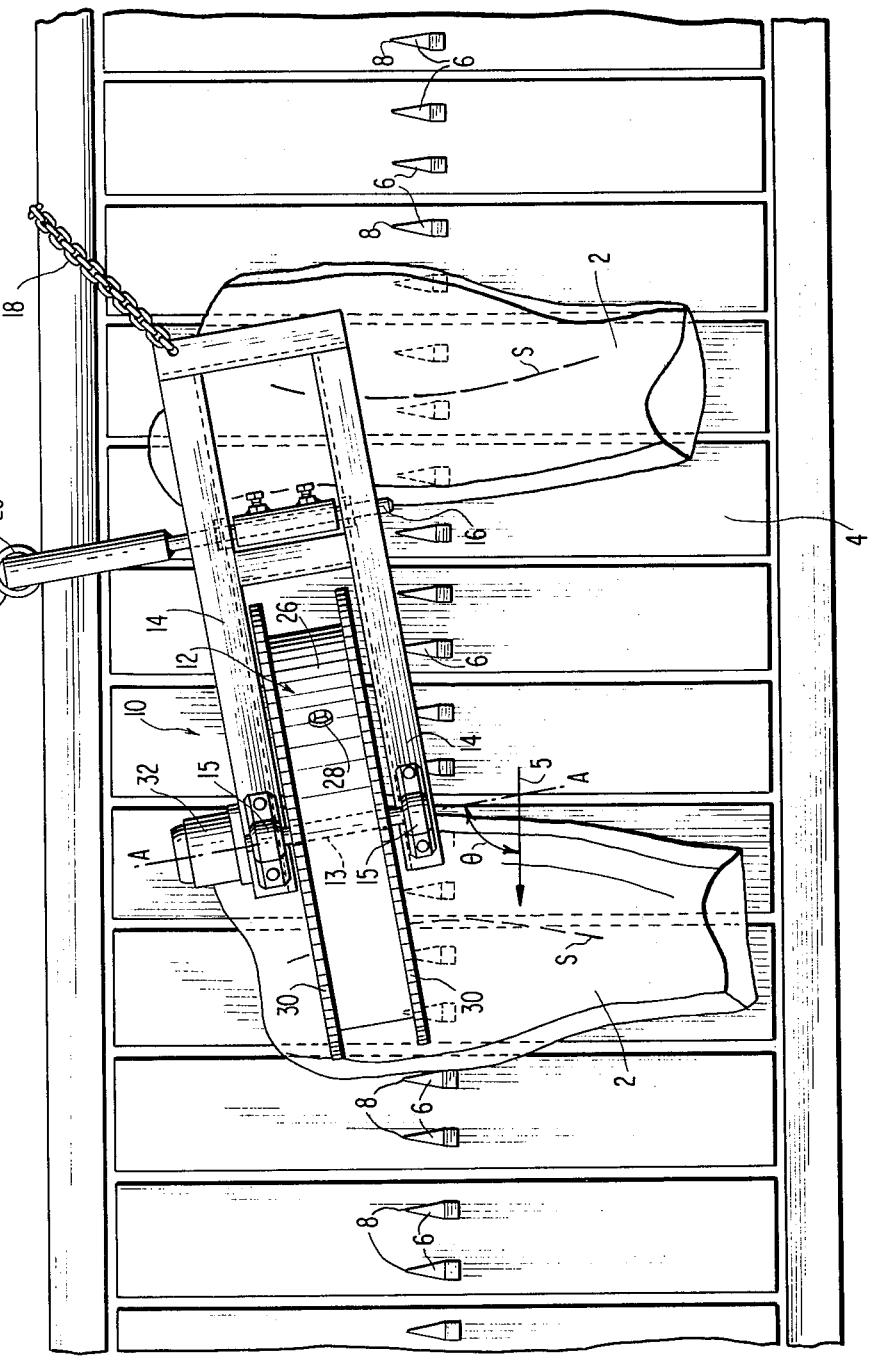
FIG. 1 is a plan view of a preferred apparatus for carrying out the invention.

The drawings show pork sides 2 supported on a conventional slat table conveyor 4 having an upper surface with a plurality of coplanar horizontal slats. The conveyor is driven in the direction of arrow 5. Each slat carries a pair of laterally-oriented impaling hooks 6 for engaging the meat and retaining it on the conveyor. As may be seen in FIG. 3, each hook 6 has an impaling end or tip 8, and is slightly inclined to the surface of its respective conveyor slat. The hooks 6 are preferably spaced apart no more than about 6 inches measured in the conveyor direction in order to avoid the necessity of precisely aligning the individual bodies of meat with the hooks as in prior apparatus. A spacing of three and one-half inches is optimum.

The hooker assembly generally designated 10 engages the pork sides advancing on the conveyor and shifts them laterally to drive them into impaled engagement on the hooks 6. The hooker assembly 10 includes a rotary wheel 12 the lower portion of which engages the sides. The wheel 12 has an axle 13 rotationally supported in bearings 15 oriented so that the rotational axis A—A of the wheel lies at an acute angle to the conveyor direction. The bearings 15 are on parallel arms 14 pivotally supported on a horizontal shaft 16. Pivotal movement of the support arm 14 enables the wheel 12 to move vertically to change its spacing from the conveyor 6. Downward movement of the wheel 12 toward the conveyor is limited by a flexible chain 18 attached at its upper end to the remote ends of arms 14 and at its lower end to the stationary frame of conveyor 6. The length of chain 18 is selected to hold the wheel 12 at a rest position located above the conveyor 6 in the path of meat on the conveyor. As the advancing meat comes into contact with the wheel 12, the wheel moves upwardly while maintaining contact with the meat, the arms 14 pivot counterclockwise as viewed in FIG. 2 and the chain 18 falls slack. After the meat passes, the wheel 12 returns to its rest position and the chain 18 is taut.

Figure 2:
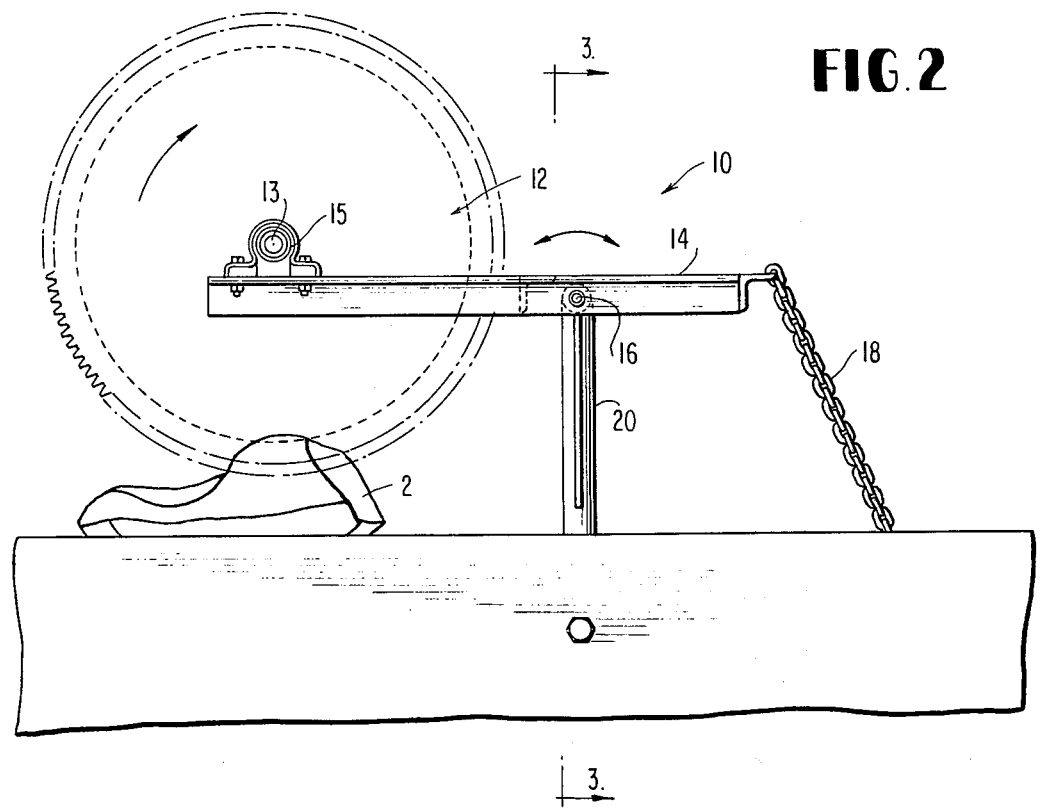
FIG. 2 is a side elevational view of the apparatus in use.

As shown in FIG. 2, the wheel 12 is formed of circular flanges 30 and a hollow cylindrical portion 26. The hollow interior of the wheel is provided with a fill plug 28 which enables it to serve as a weighting chamber. Dull teeth on the periphery of flanges 30 cause the wheel to engage the meat firmly without damage thereto.

The wheel 12 is weighted by removing plug 28 and pouring a fluent material, preferably a liquid such as water, into the interior of the wheel. The weight of the liquid in the wheel 12 governs the downward bias of the wheel and the consequent amount of force and pressure applied to the pork sides being processed. This pressure must be carefully selected so that the wheel will not damage the meat, while being sufficient to enable the dull teeth on flanges 30 to engage the meat firmly enough to produce the lateral shifting movement.

The horizontal pivot shaft 16 for arms 14 is oriented to maintain the rotational axis A—A of the wheel 12 at an acute angle $\theta$ to the conveyor direction represented by the arrow 5. This angulation is such that the lower meat-engaging portion of wheel 12 travels in a path which is convergent to the conveyor direction 5, this path having a lateral component directed oppositely to the hooks. This causes the meat while engaged by the wheel 12 to be shifted laterally on the conveyor and driven into impaled engagement on the hooks 6.

Figure 3:
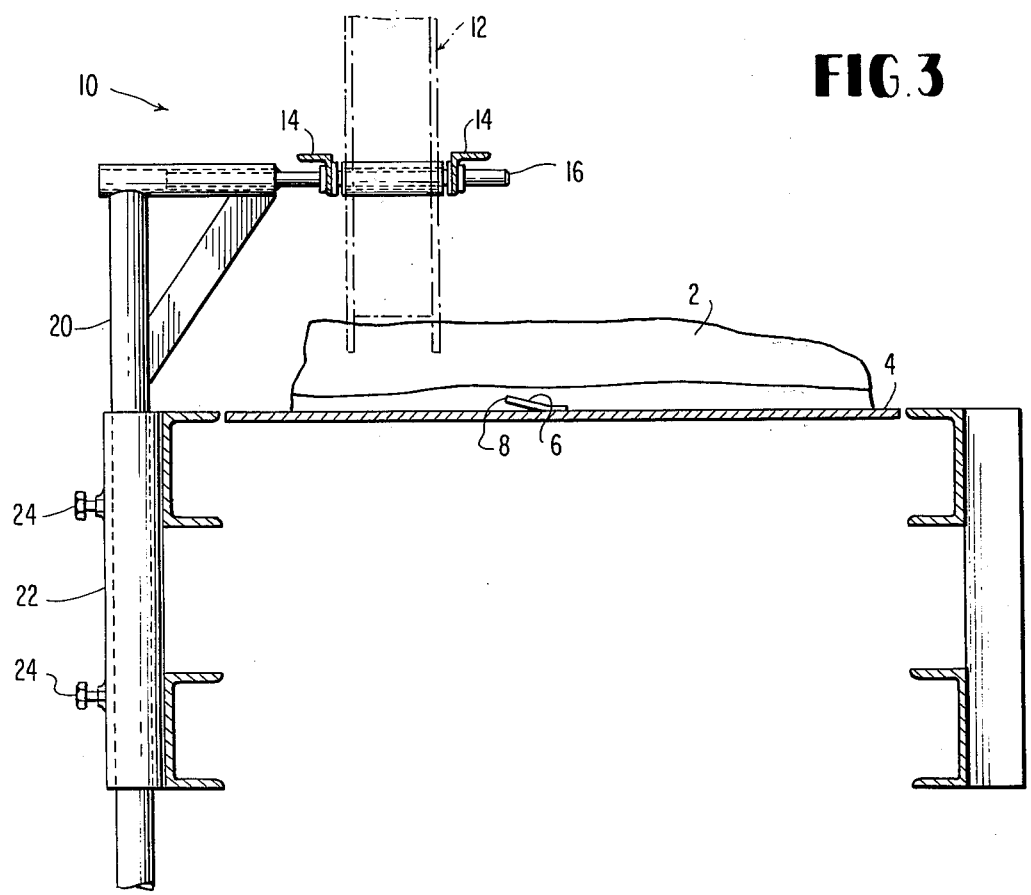
FIG. 3 is an end view of the apparatus as seen along the line 3—3 in FIG. 2.

To permit adjustment of the height of shaft 16 and the angle $\theta$, the horizontal pivot shaft 16 is supported on the upper end of a vertical rod 20 rotatable in a stationary vertical sleeve 22 shown in FIG. 3. During operation, the vertical rod 20 is nonrotatably held in the sleeve 22 by tightened set screws 24. To adjust the angle $\theta$ and the height of shaft 16, the set screws 24 are loosened, the rod 20 is moved vertically and angularly, and the set screws are retightened.

The wheel 12 may be frictionally driven by engagement with the moving pork sides; however, it is preferred to drive the wheel 12 with a drive means such as motor 32 which by gearing or other speed regulation causes the teeth of wheel 12 to have a component in the conveyor direction 5 which corresponds substantially to the conveyor velocity.

From the foregoing, the operation of the apparatus and the method of the invention will readily be understood. The conveyor is operated at a constant velocity. A pork side with loin, previously marked with a scribe line S, is placed on the conveyor, overlying the hooks 6 but not in engagement therewith. Movement of the conveyor advances the side 2 toward the wheel 12 which at this stage is at the rest position shown in FIG. 3. When the side contacts the toothed peripheral edge of the wheel 12, the wheel 12 will move upwardly from its rest position while maintaining firm contact with the meat under the downward biasing force produced by the weighted wheel 12. The upward movement of the wheel causes arms 14 to swing about the intermediate pivot shaft 16. The chain 18 falls slack.

Movement of the peripheral teeth on the wheel 12 convergent to the conveyor direction 4 causes the pork side engaged by the wheel 12 to be shifted laterally toward the left as shown in FIG. 1, causing the pork side to move into the sharpened ends 8 of the hooks 6 to the engaged position illustrated in FIG. 3. An operator equipped by a conventional double-handled loin pulling knife then cuts the pork loin from the side on the conveyor.

Those familiar with the art will recognize that the invention provides an uncomplicated but substantial improvement in apparatus and methods for processing bodies of meat. It will also be recognized that the invention may be practiced by a wide variety of techniques which differ from the specific embodiment disclosed herein. For example, there are many well known devices capable of performing the function of the wheel 12. Therefore, it is emphasized that the invention is not limited only to the disclosed embodiment, but is embracing of a wide variety of apparatus and methods within the spirit of the claims which follow.

We claim:

1. Meat processing apparatus, comprising,
   a conveyor means for supporting bodies of meat, said conveyor means being driven in a given direction and having lateral hooks provided with impaling ends,
   shifting means positioned above the conveyor in the path of bodies of meat on the conveyor for shifting the bodies of meat into impaled engagement on said hooks, said shifting means having a meat-engaging portion guided for movement in a path which is convergent to said given direction of the conveyor, said path having lateral component opposed to said hooks whereby meat on the conveyor engaged by said shifting means is shifted laterally on the conveyor and driven into impaled engagement on said hooks.

2. The apparatus of claim 1 wherein the distance between said hooks along the given direction is no more than about six inches.

3. The apparatus of claim 1 wherein the meat-engaging portion of the shifting means is downwardly biased to a rest position spaced above the conveyor, said shifting means being upwardly movable from said rest position to change its spacing from the conveyor when said meat-engaging portion is in engagement with a body of meat.

4. The apparatus of claim 1 wherein the shifting means includes a weighting chamber fillable with fluid to vary the pressure applied thereby to loins being processed.

5. The meat processing apparatus of claim 1 wherein the shifting means is a rotary member, the lower portion of which is said meat-engaging portion, said rotary member having a rotational axis lying at an acute angle to said conveyor direction to guide said meat-engaging portion in said path.

6. The apparatus of claim 5 having support means for said rotary member which enables said acute angle to be changed.

7. The apparatus of claim 5 wherein the rotary member has a toothed circular peripheral edge comprising said meat-engaging portion.

8. The apparatus of claim 5 wherein the distance between said hooks along the given direction is no more than about six inches.

9. The apparatus of claim 5 wherein the meat-engaging portion of the shifting means is downwardly biased to a rest position spaced above the conveyor, said shifting means being upwardly movable from said rest position to change its spacing from the conveyor when said meat-engaging portion is in engagement with a body of meat.

10. The apparatus of claim 5 wherein the rotary member includes a weighting chamber fillable with fluid to vary the pressure applied thereby to meat on the conveyor.

11. The apparatus of claim 5 wherein the rotary member is movable by a body of meat advancing thereunder from a rest position located in the path of a body of meat on the conveyor to a raised position when said meat-engaging portion is in contact with the upper surface of a body of meat on said conveyor.

12. The apparatus of claim 11 having means for limiting the movement of the rotary member toward said conveyor to establish a said rest position spaced from the conveyor.

13. The apparatus of claim 12 having a pivoted support arm which carries the rotary member, said support arm having an intermediate pivot which enables the rotary member to be movable in a direction which changes its distance from the conveyor, said means for limiting the movement of the rotary member toward said conveyor being a flexible member having an anchored lower end and a movable upper end attached to a point on said support arm, said intermediate pivot being located between said rotary member and said point of attachment of the flexible member.

14. The apparatus of claim 13 wherein the rotary member has a toothed circular peripheral edge comprising said meat-engaging portion.

15. The apparatus of claim 14 wherein the distance between said hooks along the given direction is not more than about six inches.

16. The apparatus of claim 5 wherein the rotary member is spaced above said conveyor in the path of meat supported on the conveyor, means for biasing said rotary member toward said conveyor, and support means enabling the rotational axis of said rotary member to move relative to said conveyor when said meat-engaging portion is in contact with a body of meat passing between the conveyor and the rotary member.

17. A method of processing a pork side including a loin on a conveyor having lateral hooks for retaining the pork side on the conveyor, said method comprising the steps of, placing the pork side on a conveyor having lateral hooks provided with impaling ends, said pork side overlying said hooks but not penetrated thereby, moving the conveyor in a forward direction to advance the pork side through an impaling station, engaging the upper surface of said pork side at said impaling station with a rotary member which has its rotational axis lying at an acute angle to said forward direction, rotating the rotary member while engaged with said pork side at said impaling station to shift the pork side laterally on the conveyor toward said impaling ends to drive the pork side into impaled engagement on said hooks, and cutting the pork loin from said side supported on the conveyor and impaled by said hooks.

18. The method of claim 17 including the steps of biasing the rotary member against the pork side while engaging the pork side and rotating the rotary member, and moving the rotational axis of the rotary member as a pork side moves between the conveyor and the rotary member to maintain the rotary member in engagement with the pork side.

19. The method of claim 17 wherein a substantially constant force is applied by the rotary member to the pork side throughout the engagement of the pork side by the rotary member.

20. The method of claim 19 including the step of moving the rotational axis of the rotary member away from the conveyor as a pork side moves between the conveyor and the rotary member to maintain the rotary member in engagement with the pork side.

21. The apparatus of claim 1 having a motor for driving the meat engaging portion of said shifting means in said path.

* * * * *